United States Patent [19]

Steltenkamp et al.

[11] Patent Number: 4,714,559

[45] Date of Patent: Dec. 22, 1987

[54] ANTISTATIC AGENTS WHICH ARE DIAMINES OF TRIALKYLACETIC ACIDS AND DIAMINES

[75] Inventors: Robert J. Steltenkamp, Somerset; Michael A. Camara, Jackson, both of N.J.

[73] Assignee: Colgate-Palmolive Company, New York, N.Y.

[21] Appl. No.: 883,193

[22] Filed: Jul. 8, 1986

Related U.S. Application Data

[63] Continuation of Ser. No. 734,508, May 16, 1985, Pat. No. 4,619,775.

[51] Int. Cl.$^4$ ............................................. D06M 3/30
[52] U.S. Cl. ..................................... 252/8.8; 252/525;
  252/541; 252/544; 8/194; 8/196; 260/404.5
[58] Field of Search ................ 252/8.8, 541, 544, 525;
  546/153; 564/153; 260/404.5; 8/194, 196

[56] References Cited

U.S. PATENT DOCUMENTS 4,440,666 4/1984 Miller et al. .................. 252/8.55 E
4,626,429 12/1986 Robbins et al. ....................... 424/70

Primary Examiner—Paul Lieberman
Assistant Examiner—Hoa Van Le
Attorney, Agent, or Firm—H. S. Sylvester; M. M. Grill; N. Blumenkopf

[57] ABSTRACT

Polyamides of trialkylacetic acids and polyamines are new compounds which are of an oily nature at washing temperatures in the 10° to 90° C. range, are capable of being adsorbed from wash and rinse waters by fibrous material, such as laundry, of synthetic fabrics, e.g., polyesters, which laundry is susceptible to being electrostatically charged, and decrease any electrostatic charge or inhibit accumulation thereof on such materials. Such polyamides, e.g., those of neodecanoic acid and ethylene diamine or hexamethylene diamine, N,N'-ethylene-bis-neodecanoamide and N,N'-hexamethylene-bis-neodecanoamide, respectively, can be incorporated in detergent compositions, in compositions for addition to rinse waters and in compositions for application to laundry in a laundry dryer.

2 Claims, 4 Drawing Figures

ANTISTATIC AGENTS WHICH ARE DIAMINES OF TRIALKYLACETIC ACIDS AND DIAMINES

This is a continuation, of application Ser. No. 734,508 filed May 16, 1985, now U.S. Pat. No. 4,619,775.

This invention relates to novel alkanoamides which have been found to be adsorbable from wash and rinse waters by fibrous materials, such as the fabrics of items of household laundry, especially synthetic polymeric fibers thereof, such as polyesters, and which have been found to impart to such fabrics especially good antistatic properties, so that the accumulation and the developement of electrostatic charges thereon is inhibited. More particularly, this invention is of multi-functional amides of trialkylacetic acids and multifunctional amines wherein the trialkylacetic acid moieties contain 1 to 10 carbon atoms in each of the alkyls thereof and the multi-functional amine moieties, which are normally aliphatic, contain from 2 to 5 amino groups. Such compounds will hereafter be referred to as polyamides and polyamines or multiamides and multiamines. They will contain at least two amide or amine groups, respectively. Also within the invention are antistatic detergents, rinse and other laundry compositions and products containing one or more of the invented antistatic compounds, and methods of treating laundry with such compositions in washing, rinsing and other operations, to impart antistatic properties to it.

Neodecanoic and neopentanoic acids are presently being marketed by Exxon Chemical Americas and are described in a bulletin issued by such company and entitled Neo Acids Properties, Chemistry and Applications (copyright 1982). Other neoalkanoic acids have also been made, such as neoheptanoic acid, neononanoic acid and mixed neododecanoic, neotridecanoic and neotetradecanoic acids. Amides of neo acids and methods for their manufacture are referred to broadly at page 10, column 1 of such bulletin, and uses of various neodecanoamides are mentioned therein, including applications as pesticides, plasticizers (for polyvinyl chloride), foam boosters, foam suppressants, and slip agents (for polyolefin films). However, no mention is made of the described multiamides of the present invention or of their uses as laundry antistats.

Computer searches of U.S. patents for the period 1950-1984 and of Chemical Abstracts for the period 1967-1985 have resulted in the finding of U.S. Pat. No. 4,440,666, directed to a hydrocarbon liquid containing a minor proportion of a reaction product of a polyalkylene polyamine and a neoacid of 5 to 20 carbon atoms, in which the amide acts as a corrosion inhibitor. This patent does not appear to disclose any of the polyamides of the present invention and does not suggest that any such compounds would have antistatic properties.

Because modern synthetic organic detergents are such excellent cleaning agents often laundry washed with them lacks desirable softness. Because synthetic polymeric fibers, which are the fibers of the fabrics of much of such laundry, are susceptible to disadvantageous accumulations of static charges, which occur during machine drying or when the fabrics are rubbed against other materials, with such tendency to static accumulation and resulting discharging or sparking, much research has been conducted in an effort to discover materials which, when incorporated in detergent compositions or in rinse waters, or when otherwise applied, would diminish any static charges on the laundry or would inhibit the accumulation of such charges.

Quaternary ammonium salts, such as di-lower alkyl dihigher alkyl ammonium halides, e.g., dimethyl distearyl ammonium chloride, have been used as fabric softeners in detergents, in fabric softening compositions for addition to the rinse water, and in papers, sponges and other substrates intended for introduction into laundry dryers, where they transfer such cationic materials to the laundry being tumbled. Certain amines have also been found to be useful in some such applications. However, because such cationic materials react objectionably with anionic detergents their use in anionic detergent compositions results in production of undesirable reaction products and causes losses of detergency. Such cationic materials also interact with optical brighteners, causing a reduction in brightening performance.

It is an important feature of the present invention that certain neutral amides have been discovered which are water insoluble and which may be in desired oily or plastic, flowable or spreadable state at normal use temperatures, e.g., 10° to 90° C., preferably 10° to 60° C. Particular amides which have the desired physical characteristics, are adsorbable or otherwise depositable onto laundry from the wash water or rinse water in a washing machine, or can be deposited onto drying laundry in the dryer, are polyamides of neoalkanoic acids. In accordance with the present invention such novel compounds are polyamides of trialkylacetic acid(s) and polyamine(s). which are useful as antistatic agents for filamentary and fibrous materials, wherein the trialkylacetic acid moieties are of 1 to 10 carbon atoms in each of the alkyls thereof and the polyamine moieties contain from 2 to 5 amino groups. Preferred polyamides are those wherein the sum of the carbon atoms of the alkyls of each of the trialkylacetic acid moieties is from 3 to 12 and the polyamine moiety is a diamine or triamine moiety with an alkylene group of 2 to 10 carbon atoms and/or polyoxyalkylene groups connecting the amide groups of polyamide. In such compounds the oxyalkylene of the polyoxyalkylene groups is of 2 to 4 carbon atoms, the number of such oxyalkylene groups in each polyoxyalkylene group is from 1 to 40, and the alkylene group of the polyoxyalkylene alkylene is of 1 to 10 carbon atoms. The described compounds are those which may be considered as reaction products of polyamine(s) and trialkyacetic acid(s) only, as illustrated herein. Also within the invention are detergent compositions, rinse compositions and "dryer products" containing the invented polyamides, and processes for applying such polyamides to laundry during washing, rinsing and drying cycles.

In this description the invented polyamides, component groups, moieties, and substituents thereof, and reactants will be referred to in the singular, as will be components of the detergent compositions, rinses and dryer products, but it should be understood that mixtures thereof are also intended. When reference is made to "neoalkyl" that is intended to describe the "residue" of a neoalkanoic acid after removal of the carboxyl therefrom.

Neodecanoic acid, which is available commercially from Exxon Chemical Americas in prime and technical grades, is synthesized by reacting a branched nonene and carbon monoxide under high pressure at an elevated temperature in the presence of an aqueous acidic catalyst (Koch reaction). The general mechanism involved includes generation of a carbonium ion followed by complexation with carbon monoxide and the catalyst to form a "complex", which is subsequently hydrolyzed to generate the free acid. The formula of the free acid is:

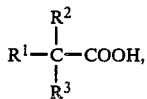

wherein the number of carbon atoms in $R^1+R^2+R^3$ is 8; about 31% of the neodecanoic acid is of a structure wherein $R^2$ and $R^3$ are both methyl and $R^1$ is hexyl; 67% is of the formula wherein $R^2$ is methyl, $R^3$ is of a carbon atoms content greater than that of methyl and less than that of $R^1$, and $R^1$ is of a carbon atoms content less than that of hexyl and greater than that of $R^3$; and 2% is of a formula wherein $R^2$ and $R^3$ are both of a carbon atoms content greater than that of methyl and less than that of $R^1$, and $R^1$ is of a carbon atoms content less than that of hexyl and greater than those of $R^2$ and $R^3$. The dissociation constant (Ka) of neodecanoic acid is $4.20 \times 10^{-6}$. Among other neolkanoic acids that are available and may be employed may be mentioned those in the 5 to 14 or 5 to 16 carbon atoms content ranges, such as neopentanoic, neoheptanoic, neononanoic, neodecanoic, neododecanoic, neotridecanoic and neotetradecanoic acids. As was previously mentioned, the polyamines are preferably diamines or triamines. The triamines are preferably alkylene polyoxyalkylene triamines, such as those sold by Texaco Chemical Company under the trademark Jeffamine(®). Of such materials Jeffamine T-403, which is of the formula

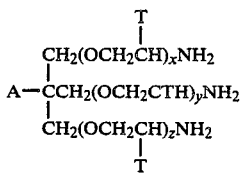

wherein A=ethyl, T=methyl, and x+y+z=5.3, is preferred. The diamines have both amino groups thereof connected by an alkylene polyoxyalkylene moiety or by a lower alkylene group. Of the commercially available diamines containing oxyalkylene groups the Jeffamines are preferred, and the formula of such compounds is

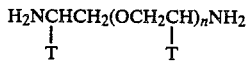

In that formula T is methyl and n is the range of 2 to 10, more preferably 2 to 7. Among such compounds which may be employed are: Jeffamine D-230, wherein n is an average of 2.6; Jeffamine D-400, wherein n is 5.6; and Jeffamine D-2,000, wherein n is 33.1. Of these diamines the most preferred is Jeffamine D-230. Among the non-alkoxylated diamines that are useful are alkylene diamines of 2 to 6 carbon atoms, such as ethylene diamine and hexamethylene diamine.

Instead of using neoalkanoic acids for the manufacture of the present polyamides, the corresponding acyl halides may be employed. Such materials are normally used as acid chlorides, such as neodecanoyl chloride, which is available from the Lucidol Division of Pennwalt Corporation, and is described in their product bulletin entitled *Acid Chorides*, printed in September, 1982, which also generally describes reactions of acid chlorides with amines.

The invented polyamides, which are of a formula selected from the group consisting of:

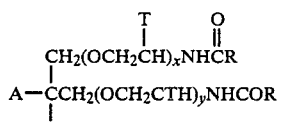

and

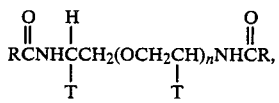

wherein A is selected from the group consisting of alkyl of 1 to 20 carbon atoms and hydrogen, T is selected from the group consisting of methyl and hydrogen, R is a neoalkyl of 4 to 13 carbon atoms, n is from 1 to 40, and x, y and z are each numerals from 1 to 8, and total from 4 to 10, may be made by reacting a neoalkanoyl chloride with a suitable polyamine, but a less costly synthesis is directly from the appropriate neoalkanoic acid by reacting it with such polyamine at an elevated temperature. The product of such reaction, unfortunately, is often darker in color than desirable, apparently due in part at least to the reaction being run at elevated temperature. It has been found that the use of ethylene glycol in the reaction mixture as a "catalyst" allows conducting of the reaction at a lower temperature and thereby improves the product color. At present, work is being done to find other catalysts which will promote the direct condensation reaction and will produce a product of improved color. Product color can be improved by utilizing the more costly reaction with neoalkanoyl chloride but work is continuing in an effort to discover a direct condensation process which will result in production of a product of improved color.

For the direct condensation process the trialkylacetic acid (or neoalkanoic acid) and the polyamine are often reacted at a suitable elevated temperature, often in the range of 180° to 320° C., e.g., about 230° to 250° C., over a period of about ½ to 8 hours, preferably 1 to 4 hours, and often using a nitrogen or inert gas "blanket" over the reaction, with stirring being continued during the entire reaction, and with water of condensation being removed continuously during the reaction. However, for some processes, especially if exothermic, cooling may be preferred, and the reactions may be at room temperature or slightly above it. The melting points of the products will normally be low, so that the products will desirably be liquids, preferably viscous, oily liquids. Such physical state is unusual for primary and secondary amides of comparable or even lower molecular weight because of strong intermolecular forces that are characteristic of the amide functionality. However, the viscous oily liquid state of the materials of the present invention is considered to be highly desirable because it aids in exerting antistatic action when incorporated in antistatic detergent compositions. It is also important for the polyamides of this invention to be only slightly water soluble, while yet being readily distributable throughout an aqueous medium at normal washing temperature, such as in the 10° to 90° C. range often 20° to 60° C. Thus, when choosing polyamine and neoalkanoic acid reactants, selecting such reactants with desired proportions of hydrophilic and hydrophobic groups, such as ethylene oxide and propylene oxide (or butylene oxide) allows one to control the hydrophile-lipophile balance of the antistat to be made, and thereby to "fine tune" its water solubility so that it can be an effective antistat in the intended product or use.

It has been found that the best antistats for use in detergent compositions or rinse compositions or for employment in washing and rinsing operations are those made from a neoalkanoic acid, such as neodecanoic acid, and a polyoxypropylene triamine, such as Jeffamine T-403. Other Jeffamines, such as Jeffamines D-230, D-400 and D-2,000, may also be employed to make the invented polyamides, and of these the Jeffamine D-230 is superior, apparently because the other Jeffamines result in products which are less effective as antistatic agents because of their higher contents of oxypropylene groups, higher molecular weights and deficiency of hydrophilic characteristics, which contribute to lowering the adsorption thereof onto fibrous surfaces. When the polyamine is ethylene diamine or hexamethylene diamine antistatic activity of the polyamides is obtainable during washing of laundry but it is not as effective as for the polyamides made with the described trialkylacetic acid and Jeffamine T-403 or Jeffamine D-230.

The Jeffamine polyamines that may be employed to manufacture the antistatic polyamides of this invention are described in a booklet entitled JEFFAMINE Polyoxypropyleneamines, published by Texaco Chemical Company and copyrighted in 1978 by Jefferson Chemical Company, Inc. Formulas of such polyamines are given at pages 2 and 3 thereof and typical physical properties of them are listed at pages 3 and 4. Uses of the Jeffamines are described throughout the booklet, primary among which is use as a component of synthetic resins, such as epoxy resins and polyurethanes. In a bibliography near the end of the booklet, at pages 61–64, textile applications of the Jeffamines and related materials are listed and summarized. In some cases antistatic finishes for textile were reportedly made by the reaction of polyoxyethylene diamine or similar polyamine with a suitable acid to make an antistatic polyamide. Among interesting references cited were Japanese Pat. Nos. 71/07,461; 71/29,914; and 71/32,519; and U.S. Pat. No. 3,558,419. However, none of the references, as mentioned in the Jeffamine booklet, describes or suggests a polyamide of the present invention, and the desirable characteristics thereof. The preferred triamides of this invention are of the formula

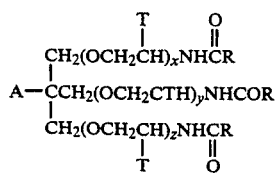

wherein A is selected from the group consisting of alkyl of 1 to 20 carbon atoms and hydrogen, T is selected from the group consisting of methyl and hydrogen, R is a neoalkyl of 4 to 13 carbon atoms, and x, y and z are each numerals from 1 to 8, and total 4 to 10. More preferably, A is an alkyl of 1 to 4 carbon atoms, T is methyl, R is a neoalkyl of 4 to 9 carbon atoms, and x, y and z are each numerals from 1 to 3, which total from 4 to 8. Still more preferably, A is an alkyl of 1 to 3 carbon atoms, T is methyl, R is neoalkyl of 4 or 9 carbon atoms and x, y and z are each numerals from 1 to 3, which on the average total from 4.5 to 6. Most preferably, A is ethyl, T is methyl, R is neoalkyl of 9 or about 9 carbon atoms and x, y and z are each numerals from 1 to 3, the total of which averages about 5.3. The preferred diamides of this invention are of the formula

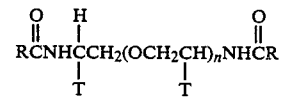

wherein T is selected from the group consisting of methyl and hydrogen, R is a neoalkyl of 4 to 13 carbon atoms, and n is from 1 to 40. More preferably, T is methyl, R is neoalkyl of 4 to 9 carbon atoms and n is a numeral from 2 to 10. Still more preferably, T is methyl, R is neoalkyl of 4 or 9 carbon atoms and n is a numeral from 2 to 7. Most preferably, T is methyl, R is a neoalkyl of 9 or about 9 carbon atoms and n is an average of about 5.6. Other useful diamides are those of a neoalkanoic acid of 5 to 10 carbon atoms with an alkylene diamine of 2 to 6 carbon atoms. Among such compounds those preferred are N,N'-ethylene-bis-neodecanoamide and N,N'-hexamethylene-bis-neodecanoamide.

It will be seen from the above formulas and descriptions of components and substituents thereof that the amine radicals of the polyamines (including diamines) are completely converted to amide form. However, while such amides are highly preferred, it is contemplated that incompletely "amidified" polyamines which are at least ⅔ amidified may also be employed as antistats. They will have some of the undesirable properties of quaternary ammonium salts, in that they may be reactive with anionic detergents, but it is expected that such reaction and resulting decrease in detergency and increase in spotting of laundry will generally be tolerable because only a proportion of the amine radicals will not have been converted to non-reactive amides. Any adverse effects due to the presence of unreacted amine groups may be ameliorated by blending with completely amidified antistats of this invention.

Mixtures of the diamides and triamides of this invention may be employed in any desired and effective proportion. Thus, for example, N,N'-ethylene-bis-neodecanoamide may be mixed with N,N'-hexamethylene-bis-neodecanomide; N,N'-ethylene-bis-neodecanomide may be mixed with N,N'-hexamethylene-bis-neopentanoamide; the tri-neodecanomide of Jeffamine T-403 may be mixed with the di-neodecanoamide of Jeffamine D-230; and the tri-neodecanoamide of Jeffamine T-403 may be mixed with N,N'-ethylene-bis-neodecanoamide, to mention only a few of the possible combinations. Also, 3- and 4-member and other combinations of the polyamides may be made.

The polyamides of the present invention may be employed to treat various fibrous materials, including polyesters, nylons, polyacrlates and acetates, blends of some or all of such materials and blends of any of such materials with natural fibers, such as cotton, to lower the tendencies thereof to accumulate objectionable static charges. They may also be used to treat non-fibrous polymeric materials, such as video tapes camera film and photographs, movie film, sound recording tapes, plastic sheets and molded (and otherwise formed) plastic items, such as items made from polyvinyl chloride (or polyvinyl chloride sheeting). In such treatments the polyamides may be applied directly or in suspension or solution, as liquids, pastes, gels, foams or sprays, to the surfaces of the items to be treated, in comparatively small proportions, normally with the proportion of polyamide to that of treated material being in the range of 0.00005 to 0.1% by weight.

Although the present antistats may be applied directly or in suspension or solution to materials being treated to make them static-free, it is usually highly preferable for them to be incorporated in other compositions that are used for different treatments of such materials. Thus, it is desirable for such antistats to be incorporable in detergent compositions so that the laundry washed with such compositions will not accumulate annoying static charges. Such compositions will comprise a detersive proportion of a synthetic organic detergent and a sufficient proportion of polyamide of this invention to be antistatic characteristic imparting to washed laundry.

The polyamides of this invention are especially advantageous for use in detergent compositions of the anionic type because, unlike quaternary ammonium halides, they do not react adversely with anionic detergents and do not complex with optical brighteners. Thus, they do not form objectionable fatty reaction products which can deposit on and mar the apperance of washed laundry, and they do not cause a diminution in detersive activity of the detergent composition. Furthermore, they are effective antistats, being adsorbable onto washed laundry, especially synthetic polymeric fibers thereof, such as polyesters, during the washing process. In preferred detergent compositions of this invention the synthetic organic detergent will be of the sulfate and/or sulfonate type, normally including a higher aliphatic chain, such as a higher alkyl of 8 to 20 carbon atoms, preferably 10 to 18, in the lipophilic portion thereof. Preferably, such materials will be present in the form of water soluble salts, e.g., sodium salts. While the present polyamides may be employed in nonionic detergent compositions or detergent compositions of various types, including amphoteric, ampholytic and zwitterionic detergents, preferably the detergent will be an anionic detergent and will usually be one or more of the following: higher alkylbenzene sulfonates; higher fatty alcohol sulfates; olefin sulfonates; paraffin sulfonates; monoglyceride sulfates; fatty alcohol ethoxylate sulfates; higher fatty acid sulfonesters of isethionic acid; higher fatty acyl sarcosides; and acyl- and sulfo-amides of N-methyl taurine. In such detergents there will normally be present a higher aliphatic or alkyl group, which is preferably linear, and which will usually be of 8 to 20 carbon atoms, more preferably 12 to 18. When lower alkoxy chains are present in the detergent, as in the mentioned ethoxylate sulfate, usually there will be from 3 to 30 ethoxies, preferably 3 to 10. Such detergents will normally be employed as sodium salts although other water soluble salts, such as potassium, ammonium and triethanolamine salts, may be used too, depending on the circumstances.

For heavy duty laundering applications the detergent composition will usually contain a builder, to increase the detergency of the anionic detergent, especially in hard water. Among the various builders that may be utilized those of preference include: the polyphosphates, sodium tripolyphosphate and tetrasodium pyrophosphate; carbonates; bicarbonates; sesquicarbonates; silicates; sesquisilicates; citrates; nitrilotriacetates; and polyacetal carboxylates; all of which are water soluble salts, and the water softening zeolites, such as hydrated Zeolite A, which are water insoluble.

The proportion of the invented neoalkanoamide in the detergent composition will be an antistatic characteristic imparting proportion (to washed laundry adsorbing the invented polyamide during washing) and such will normally be in the range of about 0.5 to 20% of the detergent composition, by weight, preferably being 1 to 10% and more preferably being 2 to 7%, and most preferably, 3 to 5%, e.g., 4%.

In addition to the polyamide, detergent and builder, the invented detergent composition, even when in solid or particulate form, will also usually contain some moisture. The proportion of moisture for such particulate solid products will normally be in the range of 2 to 20%, e.g., about 8%. The particulate material will desirably be in the form of spray dried (or agglomerated or partly agglomerated) detergent composition beads, with particle sizes in the range of No's. 10 to 140, preferably 10 to 100, U.S. Sieve Series. Other forms of the detergent composition may be made, including liquids, gels, pastes, bars and cakes, and the particulate compositions and the compositions in such other forms will also normally contain functional and aesthetic adjuvants, and may contain fillers. Such adjuvants and fillers will normally comprise the balances of the detergents. Among the adjuvants that may be employed are: fluorescent or optical brightening agents, such as stilbene brighteners; anti-redeposition agents, such as sodium carboxymethyl cellulose: soil release promoting polymers, such as Alkaril QCF, a polyoxyethylene terephthalate-polyethylene terephthalate copolymer, fabric softening agents, such as bentonite; anti-gelling agents (for use in the crutcher), such as citric acid and magnesium sulfate; colorants, such as ultramarine blue pigment, and dyes; whitening agents, such as titanium dioxide; enzymes, such as mixed proteolytic and amylolytic enzymes; and perfumes. Among the fillers or bodying agents that are sometimes employed the most preferred is sodium sulfate, although sodium chloride has also been used. In liquid detergent compositions water, lower alcohols, glycols, cosolvents, hydrotropes and anti-freeze additives may also be present.

The proportions of detergent, builder, invented polyamide antistat and moisture in the invented particulate antistatic detergent will normally be within the ranges of 5 to 35%, 10 to 85%, 0.5 to 20% and 2 to 20%, respectively. Preferred proportions are 8 to 30%, 25 to 70%, 1 to 10% and 3 to 15%, respectively, with more preferred proportions being 10 to 25%, 30 to 70%, 2 to 7% and 5 to 12%, respectively. The moisture content includes hydrate moisture that is removed by the standard moisture test, heating for an hour at 105° C., and such removed moisture is not included in the percentages given for the other components.

The detergent composition, when it is to be in particulate form, may be made by spray drying an aqueous crutcher mix of the various constituents thereof, including invented polyamide antistat, to free flowing bead form, utilizing well known drying equipment and following a standard spray drying procedure, in which a hot drying gas, which is the products of combustion of fuel oil or gas, passes concurrently or countercurrently, with respect to falling spray droplets, which are sprayed from an aqueous crutcher mix, to produce the dried beads, which are removed from the bottom of the spray tower, and subsequently may be screened or otherwise classified to desired particle size range. The beads resulting are excellent detergents and are capable of having the antistat component thereof adsorbed by laundry to lower any tendency of laundry to accumulate static charges. However, even greater antistatic activity is observable when the polyamide antistat is not spray dried with the rest of the detergent composition but is sprayed onto or otherwise applied to spray dried particles of the rest of the detergent composition, base beads or a detergent composition made by mixing together (and preferably agglomerating) particulate components thereof. In a preferred process for making nonionic detergent compositions, the polyamide is dissolved and/or dispersed in a formula proportion of liquefiable nonionic detergent at elevated temperature (40°-50° C.) and the resulting liquid is sprayed onto and absorbed by porous spray dried builder beads. The mentioned improved antistatic results are also obtainable by addition of the polyamide antistat to the wash water, with separate addition thereto of the detergent composition or its components. For such and other uses the antistat may be made in a convenient powder form, ready for use, often as an additive to detergents to make them antistatic, by being first mixed with a suitable carrier, such as Microcel (a synthetic calcium silicate powder), a filler, e.g., particulate sodium sulfate, or a fabric softening agent, e.g., bentonite, a builder or mixture of builders, or other suitable material(s). Very promising carriers are base beads for Fresh Start ® detergent, which may be porous spray dried beads of mixed sodium carbonate and sodium bicarbonate (for non-phosphate detergents) or may contain sodium tripolyphosphate in spray dried form. Such Fresh Start base beads may contain up to 40% of polyamide, e.g., 25 to 35% of the triamide of neodecanoic acid and the amine sold commercially as Jeffamine T-403,. and will still be free flowing particles. The proportion of antistat in the various carriers mentioned may be that suited for the contemplated use, changed from that for particulate detergent compositions, as it is when liquid, gel or paste detergent compositions are made, wherein the proportion of solvent or liquid medium is different from the moisture content of the solid or particulate products, and may be from 5 to 95%, but normally is from 10 to 35%. The proportions of detergent, antistat, builder, when present, and adjuvants, when present, will be adjusted accordingly, normally with the relative proportions thereof being maintained about the same as in the particulate solid composition, in which the adjuvant content will usually be in the range of 3 to 30%, and the filler content may be from 5 to 50%. However, the proportion of polyamide antistat in such detergent compositions and in other antistatic preparations will be maintained at a level at which the polyamide is capable of imparting antistatic properties to the material to be treated, when the composition is employed in appropriate manner. One of skill in the art will be able to modify the formulations so as to make products of greatest utility and satisfactory stability. Similarly, it is contemplated that the formula will be changed when it is desired to produce compositions to be used in the rinse or in the dryer. Rinse compositions may sometimes contain only the invented polyamide dissolved in a suitable solvent medium or dispersed in an aqueous liquid medium, often preferably with the aid of a hydrotrope or other surface active component or solubilizer. The proportion of antistat will preferably be kept about the same as that for the antistatic particulate detergent composition previously discussed, e.g., 0.5 to 20%, although less could be used because in the absence of the detergent and builder the antistat will usually be more substantive. For liquid preparations for use in the rinse water, the proportion of solvent or liquid will normally be from 50 to 90%, while any surface active material or hydrotrope content will usually be in the range of 0.1 to 5%. If quaternary ammonium halide is also present the proportion thereof will desirably be in the range of one part of the quaternary compound to ½ to 10 parts of polyamide antistat. Additionally, when a polyurethane or cellulose sponge strip or a cloth or paper substrate is impregnated with the antistat of this invention (usually with the weight percentage thereof being from 10° to 100% of the weight of the substrate), a fatty material, such as monoglyceride or diglyceride of higher fatty acids may be present too, to aid in the depositing of the polyamide onto the surfaces of the fabric fibers. A suitable such material is coconut oil fatty acids diglyceride.

When the invented polyamide antistat is applied to laundry during the washing or rinsing operation, by adsorption thereof onto the laundry from the wash water or the rinse, the concentration of the detergent composition or the rinse preparation in the wash water will be sufficient to impart antistatic properties to the washed laundry, e.g., laundry items of polyester or polyester cotton blend fabrics. Such an effective concentration will normally be in the range of 0.002 to 0.05% of polyamide and preferably such range will be 0.004 to 0.02%. The detergent composition or rinse composition concentration in the wash water will normally be in the range of 0.05 to 0.5%, preferably being 0.08 to 0.2%. The wash or rinse water will normally be at a temperature in the range of 10° to 90° C., e.g., 30° to 50° C., with the lower part of the 10° to 90° C. washing temperature range being typical for American home laundry practice and the upper part of that range being that employed in European practice, especially when perborate-containing detergent compositions are employed (the rinse temperature will normally be in the lower part of such range for both). In American practice the normal washing temperature will be in the range of 20° to 60° C., and for "cold water washing" and rinsings such range is often from 20° to 40° C. (or lower for rinsing). The washing operation will normally take between five minutes and one hour, with rinsing taking from two to twenty minutes of that time. The water employed may be soft or hard and hardnesses between 0 and 250 p.p.m. (mixed calcium and magnesium hardnesses, as calcium carbonate) may be encountered. Under such washing and/or rinsing conditions the invented polyamides are sufficiently substantive to the laundry being washed, especially that of synthetic organic polymers, such as polyesters, to be adsorbed thereon in sufficient proportion to make the polymer antistatic, thereby diminishing any static charges that could otherwise accumulate on the polymer during a machine drying (tumbling) operation or as a result of frictional forces applied to the polymer surface, as by rubbing against other materials.

When washed laundry is treated in the dryer with substrate materials onto which the invented polyamide or a mixture thereof with quaternary ammonium salt has been deposited it is found that the dried laundry resulting is of a diminished tendency to accumulate static charges.

The results obtained, using any of the described processes, are generally better than those achieved by the use of higher alkyl isostearamides, as described in U.S. Pat. No. 4,497,715, issued Feb. 5, 1985 to Robert A. Bauman, and are even better than those obtained using mononeoalkanoamides as antistats, which are described in our U.S. patent application Ser. No. 716,871. Although the isostearamides and mononeoalkanoamides are very effective antistats, which do not react adversely with anionic detergents, at least some of the present polyamides, e.g., the Jeffamine T-403 polyamides of neodecanoic acid, are even more effective in antistatic activity, so formula percentages and application rates thereof can be decreased substantially, leading to significant savings, and to better products.

While any of the methods of application of the invented polyamides to materials to be made antistatic may be employed, and good antistatic properties will be imparted to the treated material, it is within the invention to utilize a plurality of such application operations, such as washing, rinsing and drying, or some or all of them, in the presence of the antistat. Also, laundry may be brushed or sprayed with the antistat in solution or dispersion, and other materials, such as carpeting, may be similarly treated. However, a significant advantage of the present antistats is in their compatibility with anionic detergents in detergent compositions and wash waters, wherein antistatic proportions of quaternary ammonium salts often have undesirable effects on the detergent action of the anionic detergents and cause objectionable reactions which often result in objectionable spotting (with the reaction products) of the laundry or other items being washed.

Infra-red absorption spectra for several representative polyamides of this invention are shown in the accompanying drawing, in which.

The following examples illustrate but do not limit the invention. Unless otherwise indicated, in these examples, the specification and claims, all parts given are by weight and all temperatures are in °C.

EXAMPLE 1

146 Grams of Jeffamine T-403 polyoxypropylene triamine are reacted with 165 grams of Exxon neodecanoic acid (prime grade) in a one liter, three-necked glass flask fitted with a magnetic stirrer, a heating mantle and an ice condenser. The condensation reaction is conducted at a temperature of 250° C. and is monitored by observing the water collected from the condenser. After six hours the reaction is essentially complete and the flask is removed from the heating mantle. It is allowed to stand until it is cooled to room temperature and the contents are then transferred to a one-liter separatory funnel, in which they are washed sequentially with solutions of: water, ethanol and hydrochloric acid; water and ethanol; aqueous sodium hydroxide; and distilled water, until neutral. After completion of washing the excess water is drained off and the washed product is dried in a vacuum rotary evaporator, yielding 260 grams of product.

Figure 1:
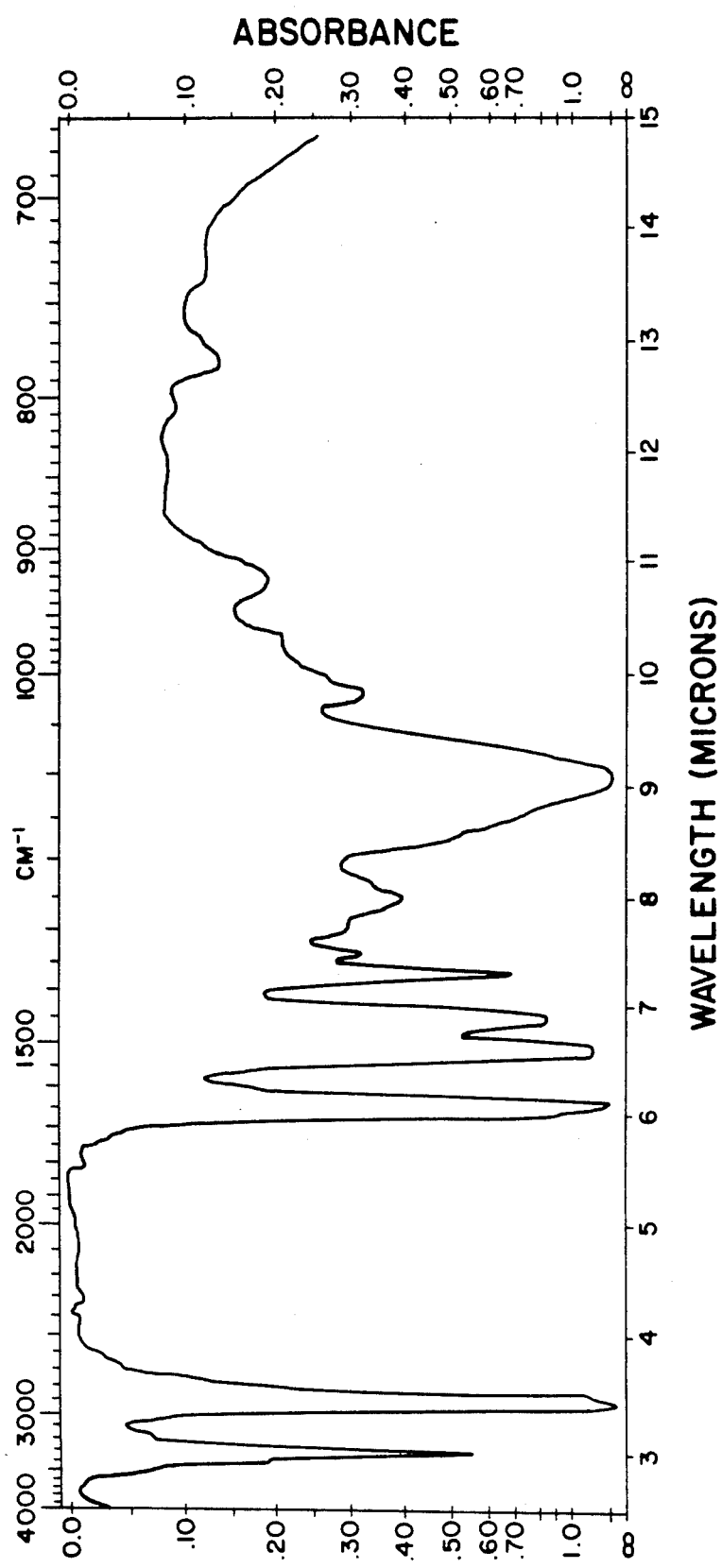
FIG. 1 is such an absorption spectrum for the trineodecanoamide of the polyoxypropylene triamine sold as Jeffamine T-403.
Figure 2:
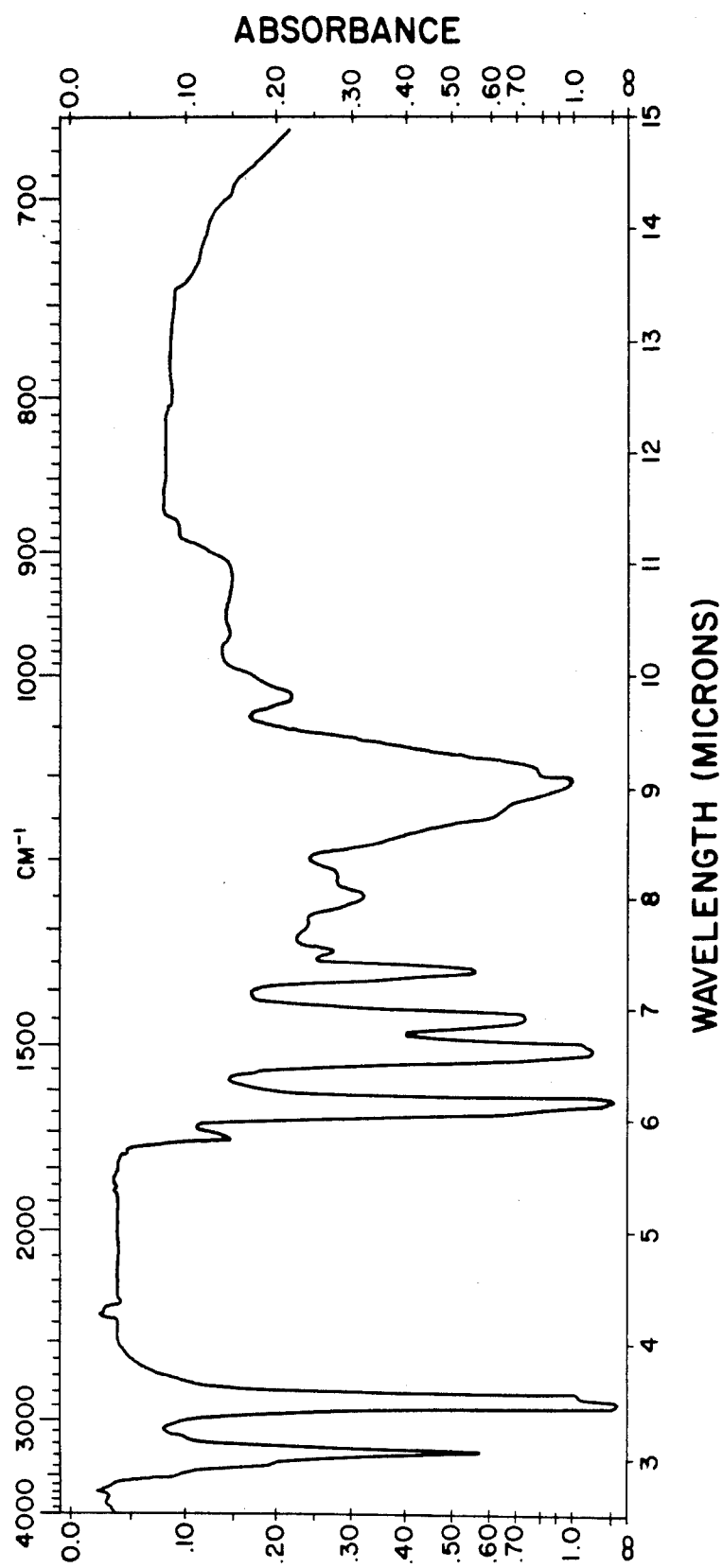
FIG. 2 is such a spectrum for the dineodecanoamide of the polyoxypropylene diamine sold as Jeffamine D-230.
Figure 3:
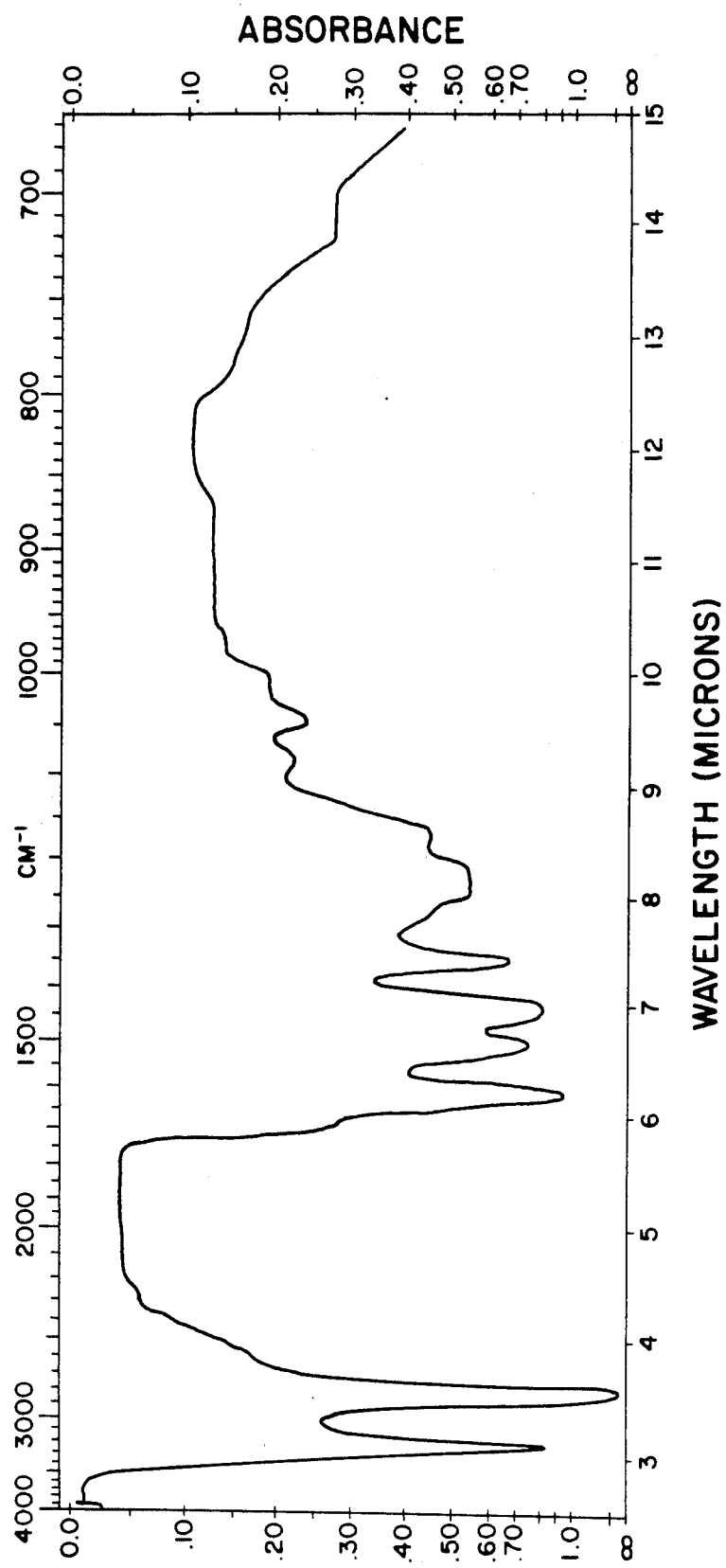
FIG. 3 is such a spectrum for the dineodecanomide of neodecanoic acid and hexamethylene diamine.
Figure 4:
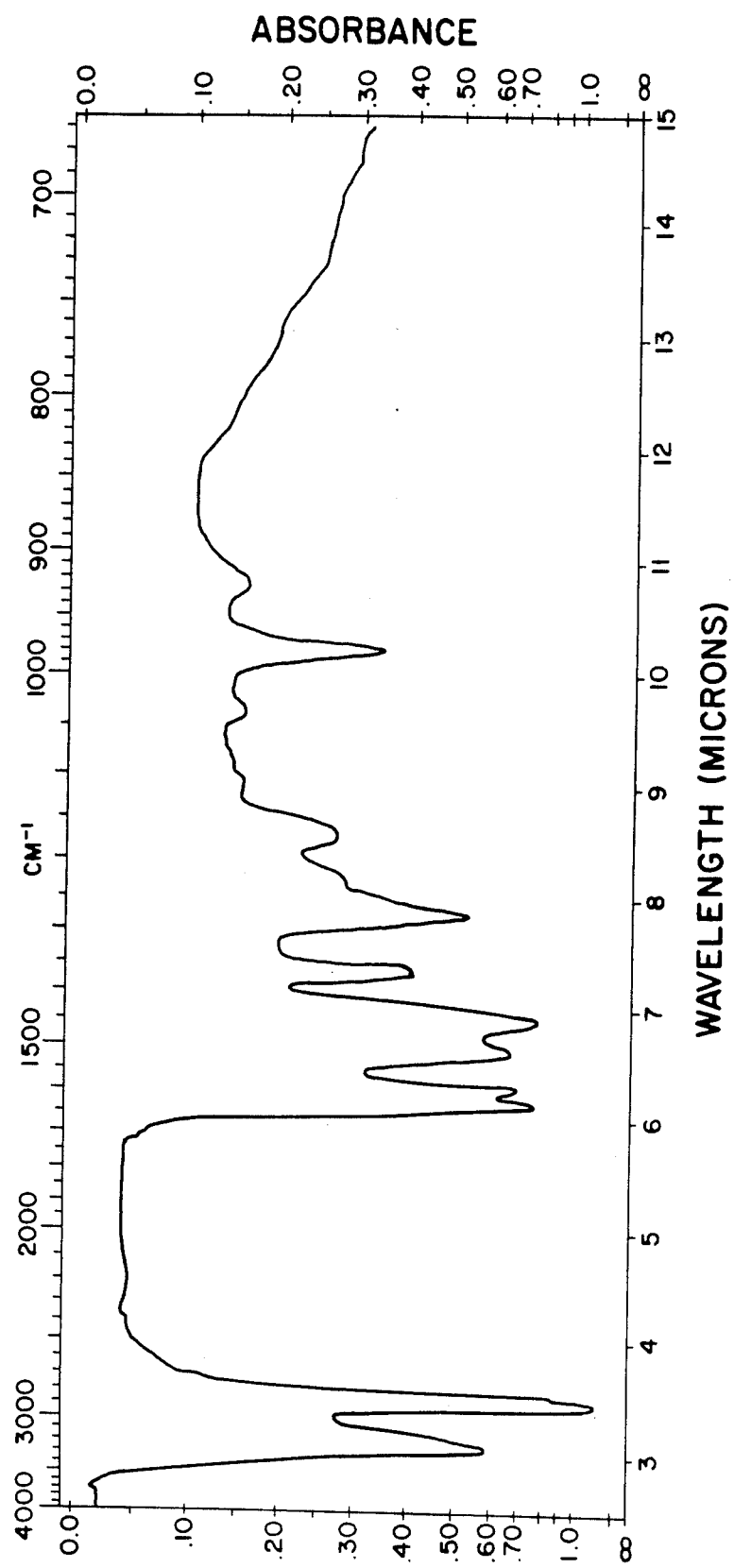
FIG. 4 is such a spectrum for the dineodecanoamide of neodecanoic acid and ethylene diamine.

The product is a relatively dark colored oil with a melting point less than 0° C. and a refractive index ($N_D 20°$ C.) of 1.4745. The infrared absorption spectrum for the polyamide made, which is the triamide of neodecanoic acid and the polyoxypropylene triamine, is given in FIG. 1. A nuclear magnetic resonance spectrum is obtained and is consistent with the expected structure.

With 10% of the weight of the reactants (about 30 grams) of ethylene glycol is present in the reaction mixture as a catalyst for the condensation reaction the temperature of the reaction may be decreased to 230° C. and the amide made is lighter colored.

A still lighter colored oily liquid product may be obtained by utilizing neodecanoyl chloride instead of neodecanoic acid. Additionally, the reaction temperature may be lowered. Consequently, the product obtained is lighter in color. For the neodecanoyl chloride reaction with Jeffamine T-403 the weight of neodecanoyl chloride utilized is 190 grams and the reaction is run at 30° C. or less, (using an ice bath to maintain the low temperature, the reaction being exothermic) for a period of three hours, after which it is considered to be complete. In addition to the mentioned reactants there are also present in the one-liter three-necked flask (which is fitted with a condenser with a Drierite tube, a thermometer, a Chesapeake stirrer and a dropping funnel) 700 ml. of diethyl ether as a solvent medium for the reaction, and a gram mole (101 g.) of triethyl amine (which acts as a trap for HCl).

After completion of addition of the neodecanoyl chloride the ice bath is removed from the flask and the reaction mix is allowed to come to room temperature, after which it is stirred for an additional one to three hours. It is then transferred to a two-liter separatory funnel and is washed twice with water, once with 5% aqueous hydrochloric acid, and once with 5% aqueous sodium hydroxide, followed by one or more washings with distilled water until the product is neutral to pH paper. Any remaining ether is removed by means of a steam bath and the product is finished on a vacuum rotary evaporator. The product made is water white to light amber in color, is pure and exhibits the infrared and N.M.R. spectra previously described for the same product made by the condensation method.

EXAMPLE 2

In a variation of the acid chloride manufacturing method for making polyoxypropylene tri-neodecanoamide, using a three-liter three-necked flask with a Chesapeake stirrer, condenser, thermometer, dropping funnel and ice bath, there were added to the flask 206 grams of the Jeffamine T-403 polyoxypropylene triamine, 600 milliliters of methylene chloride and 135 g. of triethyl amine. Holding the temperature below 30° C., by regulating the addition rate, there were added to the flask through the dropping funnel 255 g. of neodecanoyl chloride (obtained from Pennwalt Corporation). After addition of the neodecanoyl chloride the reaction mixture was kept at about room temperature and was stirred for an additional three hours. Subsequently it was washed twice with 500 ml. portions of distilled water, twice with similarly sized portions of 10% sodium hydroxide solution (in water), and then with water until it showed neutral to pH paper. The resulting methylene chloride solution of polyoxypropylene tri-neodecanoamide was then filtered through anhydrous sodium sulfate, the methylene chloride was evaporated off and the amide product was recovered.

EXAMPLE 3

Polyoxypropylene di-neodecanoamide was produced by the condensation method, using a 500 ml. three-necked flask fitted with a magnetic stirrer, a heater, a condenser with a Dean Stark trap, and a thermometer with a thermowatch control for the heater. A nitrogen inlet was connected to the flask so that nitrogen gas could be maintained above the surface of the reaction mixture to blanket it. There were added to the flask 95 grams of Jeffamine D-230 polyoxypropylene diamine of approximate molecular weight of 230 (containing an average of 2.6 moles of propylene oxide per mole of diamine), and 172 grams of neodecanoic acid. The mixture is covered with nitrogen, is heated to a temperature in the range of 270° to 300° C., and is held at such temperature for five hours. The reaction is considered to be complete then and the reaction product is then transferred to a separatory funnel and is washed three times with 5% aqueous sodium hydroxide solution, followed by three washings with distilled water. The excess water is removed and the product is dried on a rotary evaporator.

EXAMPLE 4

By methods like those of Examples 1-3 but with the conditions recited in Table 1, below other amides of this invention were made.

TABLE 1

| Amide Designation | Method | Starting Materials | Conditions |
|---|---|---|---|
| E-DEC | acid chloride | 60 g. ethylene diamine<br>361 g. neodecanoyl chloride<br>202 g. triethyl amine | 20–30° C.<br>3 hrs. |
| E-DEC | condensation | 65 g. ethylene diamine<br>344 g. neodecanoic acid | 300° C.<br>5 hrs. |
| H-DEC | condensation | 58 g. 1,6-hexane diamine<br>184 g. neodecanoic acid | 270–280° C.<br>6 hrs. |
| TRI-DEC | condensation | 200 g. Jeffamine T-403<br>258 neodecanoic acid | 250° C.<br>5½ hrs. |
| TRI-DEC | condensation | 50 g. Jeffamine T-403<br>65 g. neodecanoic acid<br>24 g. ethylene glycol | 195° C.<br>5 hrs. |
| J-DEC | condensation | 200 g. Jeffamine D-400<br>172 g. neodecanoic acid | 165–175° C.<br>16 hrs. |
| TRI-HEP | condensation | 110 g. Jeffamine T-403<br>98 g. neoheptanoic acid | 220° C.<br>10 hrs. |

Physical characteristics of the products of this example and of Examples 1-3 are measured and infra-red spectra and nuclear magnetic resonance spectra (proton and $C_{13}$) were run on some of the products. The melting points of all the products are less than 0° C. Refractive indexes are 1.4782 for the ethylene diamine-neodecanoic acid condensation product; 1.4742 for the hexamethylene diamine-neodecanoic acid condensation product; 1.4667 for the Jeffamine D-230-neodecanoic acid condensation product and 1.4745 for the Jeffamine T-403-neodecanoyl chloride reaction product. Copies of the infra-red spectra of TRI-DEC, J-DEC, H-DEC and E-DEC are in FIGS. 1–4, respectively, of the drawing. These and all the multi-neodecanoamides that were made and which were subjected to infra-red analysis exhibited similar infra-red absorption bands with respect to: secondary amide stretch (N—H), wherein the absorption is strong at 3350 cm.$^{-1}$; secondary amide carboxyl (C=O) wherein the absorption is strong at 1633 cm.$^{-1}$; and ether stretch (C—O) wherein the absorption is very strong at 1,100 cm.$^{-1}$ for the polyoxypropylene amides (made from the Jeffamines).

The proton and $C_{13}$ nuclear magnetic resonance spectra run on TRI-DEC are consistent with the structure of this amide. These spectra were very complex, because of the presence of the isomeric mixtures.

| Component | Percent |
|---|---|
| Sodium linear tridecylbenene sulfonate | 13.4 |
| Sodium tripolyphosphate | 24.0 |
| Sodium silicate ($Na_2O:SiO_2$ = 1:2.4) | 6.3 |
| Sodium carbonate | 4.5 |
| Borax | 1.0 |
| Fluorescent brighteners | 0.3 |
| Methyl cellulose | 0.5 |
| Sodium carboxymethyl cellulose | 0.2 |
| Sodium sulfate | 49.6 |
| Perfume | 0.2 |
| | 100.0 |

A spray dried detergent composition of the above formula is made by spray drying an aqueous crutcher mix of 60% solids content in a conventional countercurrent spray drying tower to produce spray dried detergent beads, less perfume, which beads are subsequently perfumed by spraying onto the surface thereof the formula proportion of liquid perfume. The product is screened so that the particle sizes thereof will be in the range of No's. 10 to 100, U.S. Sieve Series. Then, five parts of di-alkanoamide or tri-alkanoamide of the types described in the previous examples are sprayed onto 100 parts of the detergent composition beads to produce antistatic detergent compositions. Instead of mixing the alkanoamide with the detergent composition to make an antistatic detergent composition, it may be added to the wash water, and sometimes it is preferably added to the rinse. The effects of the presences of the various antistat materials on the detergent compositions made are evaluated by washing test fabrics in top loading Whirlpool washing machines and drying them in electric automatic clothes dryers, after which, using both a human panel and an apparatus for measuring electrical charges, they are tested for static accumulations. A ballast load is employed in the washing machine with the test swatches. The ballast load (five lbs.) consists of ⅓ cotton terry face cloths; ⅓ cotton percale swatches (14"×15"); and ⅓ of 65% Dacron: 35% cotton swatches (14"×15", without durable press finish). The test swatches used for antistatic effect measurement are of: double knit twill; 65% Dacron-35% cotton permanent press; blue permanent press; and nylon. In the test procedure employed, after thorough cleaning of the washers and dryers, using 3A denatured alcohol, followed by air drying, the washing machine is set for a 14 minute wash tine, using 17 gallons of water at 120° F. The "hot" wash is one utilizing the normal machine cycle, including a cold rinse with tap water. The detergent composition, containing the antistat, is added to the wash water after the machine is filled, the machine is allowed to agitate for about ten seconds and then the ballast load of terry towels and other cloths (5 lbs.) and different synthetic polymeric test swatches are separately added, while agitation is continued. Subsequently the various fabrics are removed and placed in the electric dryer, where they are dried over a period of about two hours. The test swatches and two terry towels from the ballast are then dried for an additional ten minutes and the test swatches are then evaluated for static cling by a test panel of experienced evaluators. Prior to instrumental static measurements, which are subsequently conducted, the test swatches are hung in a low humidity room (25% relative humidity) overnight. To determine the static charges on the average test material instrumentally, after washing with the detergent composition containing antistat, all of the static test swatches are rubbed in controlled manner, with wool, under controlled conditions, at a relative humidity in the range of 25 to 30%, after which the electrostatic charges on the swatches are measured and the measured electrostatic charges are averaged for each material, after which the averages for the materials are again averaged, resulting in a static index. It has been found that differences of as little as six index units (in kilovolts) are significant and indicate that consumers will notice the difference in the static clings of washed materials different in static indexes by six units.

The following table gives the static indexes for detergent compositions of this example and some prior compsitions, which are charged to the washing machine at the rate of 105 grams per load (100 g. detergent composition plus 5 g. antistat) which is 0.155%, on the basis of the wash water.

TABLE 2

| Antistat with Detergent Composition (5 g. A + 100 g. D.C.) | Static Value (kilovolts) | Observed Static and Cling After Automatic Drying |
| --- | --- | --- |
| Control (no antistat) | 38 | Extremely heavy |
| E-DEC | 21 | Light |
| H-DEC | 23 | Light |
| J-DEC (MW = 230) | 22 | Very light |
| J-DEC (MW = 400) | 31 | Moderate to heavy |
| TRI-DEC (MW = 403) | 20.5 | None |
| CISA (coco-isostearamide, U.S. Pat. 4,497,715) | 25 | Moderate |
| T-DEC (tallow neodecanoamide, S.N. 716,871) | 24 | Moderate to light |

From the data in Table 2 it is seen that the TRI-DEC is the most effective antistat of those materials tested, both with respect to static values measured and absence of static and static cling, as reported by a test panel of experience evaluators. However, the other products of the present invention that were tested also resulted in improvements in static control of synthetic fabrics, such as polyesters, and thus are useful as components of detergent compositions, for that purpose. When such materials are incorporated in the rinse water in comparable concentrations of the active ingredient, such antistatic effects are also obtained on the synthetic fabrics present, especially polyesters. Similarly, when the antistats are present in dryer products, such as papers or polyurethane sponges for contacting laundry while it is being tumbled in the dryer, or when they are sprayed onto laundry in the dryer such desirable antistatic effects also result, especially for polyester-containing fabrics. For laundry dryer use the proportion of antistat employed is about the same with respect to the weight of the dry laundry as that employed when the detergent compositions are used in washing laundry, which, for TRI-DEC is about 0.2%. However, proportions of the antistats for rinse and dryer product applications may be in ranges employed when using the detergent compositions, on the basis of the laundry being treated.

Experimentation, like that described in this Example, has established that to obtain complete absence of static for average laundry loads containing synthetic fabrics, including polyesters, there should be present at least 3.5% of TRI-DEC in the detergent composition. To obtain comparable activity with other polyamides of this invention one should have at least 5% of H-DEC, E-DEC or J-DEC (D-230). For the previous leading non-cationic antistats, T-DEC and CISA, there will normally be used (to obtain the same antistatic activity) at least 7.5% and 9%, respectively.

The comparatively small percentage of TRI-DEC required to eliminate any static charges on washed and machine dried laundry facilitates the manufacture of the invented detergent compositions. Because it has been noted that spray drying of the antistat with the detergent composition components in the crutcher mix diminishes antistatic activity it is desirable to post-add the antistat to the previously spray dried detergent composition beads, as described earlier in this example. Post-addition of larger proportions of the normally liquid antistat can result in the production of a particulate detergent of noticeably poor flow characteristics than one containing less antistat. Accordingly, in addition to being more economical, the use of the antistats of this invention in detergent compositions allows for the production of an effective product which has more desirable physical characteristics, e.g., flowability.

The various antistats described above were also tested for actual deposition onto surfaces of washed laundry, using an ESCA apparatus (electronic surface composition analysis). By such testing it was established that in the molecular surface layer of Dacron fabrics that were washed with the invented detergent compositions TRI-DEC constituted 70% by weight, with H-DEC, E-DEC and J-DEC being 38%, 25% and 36%, by weight, respectively and with comparatives CISA and T-DEC being 28 and 35%, by weight, respectively. Because the adsorptions of the diamides and of the monomides are about the same, whereas the antistatic activity of the diamides is higher, antistatic activity of the present compounds also depends on amide content, as well as adsorption onto the washed fabrics. The triamides, such as TRI-DEC, are higher in amide content and are best adsorbed, leading to superior antistat effects. This also explains why triamides like TRI-DEC, but of very high molecular weight, e.g., of M.W.=5,000 (due to additional propylene oxide content), and resulting low amide content, are less effective than TRI-DEC.

The washing tests described above were run at a normal washing temperature, 120° F. or 49° C., and at such a temperature with 3.5 percent TRI-DEC content in the detergent compositions described, using a five pound laundry ballast load, the polymeric test fabrics show light static, in the opinion of the panel members, with the static value being 19 kilovolts. When the wash water temperature is lowered to 100° F. (38° C.), 80° F. (27° C.), and 60° F. (15.5° C.), the static values drop to 16, 17 and 12, respectively, and the observed static (by the panel) is none, in each case.

At the various washing temperatures mentioned immediately above the detersive activity of the detergent composition is essentially the same, whether or not it contains the antistat. Thus, the antistat has no adverse effect on detergency, unlike quaternary ammonium halide antistats, which interfere with washing activity of anionic detergents by reacting with them.

In addition to the detergent compositions described in Example 5 hereof, other detergent compositions are made, utilizing other di-alkanoamides and tri-alkanoamides, as previously described in this specification, e.g., di-pentanoamides, tri-tridecanoamides, in replacement of those of this example. Also, mixtures of such polyamides are made. Such are substituted for the polyamides of this example in the detergent composition formula and result in laundry washed with such compositions being effectively cleaned, without any adverse effect due to the presence of the antistat (unlike when cationic antistats are used) and useful antistatic actions on the washed laundry, especially laundry containing synthetic polymers, such as polyesters, are noted. Such is also the case when the proportions of the various components of the detergent composition, including the antistat, are varied ±10%, ±20% and ±30%, while remaining within the ranges given in the specification. In addition to changing the antistat, the anionic detergent is modified, with the other anionic detergents and mixtures thereof described in the specification being substituted for the sodium linear tridecylbenzene sulfonate. For example, sodium linear dodecylbenzene sulfonate, sodium lauryl sulfate and sodium paraffin sulfonate of 10 to 18 carbon atoms in the paraffin chain, are so utilized. In such cases useful antistatic activity on the laundry is observable and the antistats do not interfere with the detergency of the composition.

EXAMPLE 7

TRI-DEC is sprayed onto a moving surface of porous spray dried non-phosphate FRESH START base beads, which include about 40% of sodium carbonate, 40% of sodium bicarbonate, 2% of sodium silicate, 12% of moisture and 6% of various adjuvants (including fluroescent brighteners, dyes and pigments) so that the antistat content is 30% by weight. Where suitable, the base beads may contain sodium tripolyphosphate, too, to the extent of 30%, with the carbonate and bicarbonate contents being reduced to 25% each. The product resulting is flowable and is useful as an additive for detergent compositions, especially anionic detergent compositions, to contribute antistatic and building activity to them.

The invention has been described with respect to various illustrations and embodiments thereof but is not to be limited to these because it is evident that one of skill in the art, with the present specification before him, will be able to utilize equivalents and substitutes without departing from the invention.

What is claimed is:

1. An antistatic agent for filamentary and fibrous materials which is N,N'-ethylene-bis-neodecanoamide.

2. An antistatic agent for filamentary and fibrous materials which is N,N'-hexamethylene-bis-neodecanoamide.

* * * * *